United States Patent
Thakur et al.

(10) Patent No.: US 9,274,515 B2
(45) Date of Patent: Mar. 1, 2016

(54) SYSTEMS AND METHODS FOR RECORDING DATA ASSOCIATED WITH THE OPERATION OF FOUNDATION FIELDBUS DEVICES

(75) Inventors: Pavan Kumar Singh Thakur, Andhra Pradesh (IN); Venkata Chandrakanth Alahari, Andhra Pradesh (IN); Rao Perampalli Nekkar Raghavendra, Singapore (SG)

(73) Assignee: General Electric Company, Schenectady, NY (US)

( * ) Notice: Subject to any disclaimer, the term of this patent is extended or adjusted under 35 U.S.C. 154(b) by 637 days.

(21) Appl. No.: 13/294,688

(22) Filed: Nov. 11, 2011

(65) Prior Publication Data

US 2013/0124670 A1 May 16, 2013

(51) Int. Cl.
*G06F 15/177* (2006.01)
*G06F 15/173* (2006.01)
*G05B 19/042* (2006.01)

(52) U.S. Cl.
CPC .... *G05B 19/042* (2013.01); *G05B 2219/25061* (2013.01)

(58) Field of Classification Search
USPC .......................................... 702/183; 709/221
See application file for complete search history.

(56) References Cited

U.S. PATENT DOCUMENTS

| | | | |
|---|---|---|---|
| 7,123,974 B1 | 10/2006 | Hamilton | |
| 8,234,357 B2 * | 7/2012 | De Groot | 709/221 |
| 8,306,658 B2 * | 11/2012 | Kilian | 700/247 |
| 2007/0096244 A1 * | 5/2007 | Roth | 257/478 |
| 2007/0250180 A1 * | 10/2007 | Bump | G05B 19/41845 700/1 |
| 2008/0082297 A1 * | 4/2008 | Lundeberg et al. | 702/183 |
| 2008/0288933 A1 * | 11/2008 | Budmiger et al. | 717/168 |
| 2010/0114549 A1 * | 5/2010 | Kolavi | G06F 17/5022 703/13 |
| 2011/0153078 A1 * | 6/2011 | Kilian | 700/247 |
| 2011/0153786 A1 * | 6/2011 | Merkel et al. | 709/220 |

* cited by examiner

*Primary Examiner* — Emmanuel L Moise
*Assistant Examiner* — Mahran Abu Roumi
(74) *Attorney, Agent, or Firm* — Sutherland Asbill & Brennan LLP

(57) ABSTRACT

Systems and methods are provided for recording data associated with the operation of Foundation Fieldbus devices. Device parameter data associated with one or more Foundation Fieldbus devices may be received by a device comprising one or more computers. A visual representation of the operation of the one or more Foundation Fieldbus devices may be generated by the device receiving the device parameter data. The device may then record at least a portion of the device parameter data received to generate the visual representation.

13 Claims, 2 Drawing Sheets

SYSTEMS AND METHODS FOR RECORDING DATA ASSOCIATED WITH THE OPERATION OF FOUNDATION FIELDBUS DEVICES

FIELD OF THE INVENTION

Embodiments of the invention relate generally to Foundation Fieldbus devices and more specifically to monitoring the operation of Foundation Fieldbus devices.

BACKGROUND OF THE INVENTION

Control systems are utilized in a wide variety of different applications. For example, control systems are utilized in conjunction with power generating devices, in power plants, anti/or in process plants. A control system typically includes a central controller in communication with other components of the control system, for example, sensors, measurement devices, valves, etc. The central controller typically communicates with the other components via suitable network communications.

With the development and adoption of the Foundation Fieldbus standard, Foundation Fieldbus devices have been incorporated into control systems. The use of visualization controls offered by Foundation Fieldbus Device Description ("DD") Services allows various Fieldbus device parameters to be updated and illustrated in the control system. However, existing systems do not allow the recording and playback of data associated with the operation of the Fieldbus devices. Accordingly, there is an opportunity for systems and methods that facilitate the recording of data associated with the operation of Foundation Fieldbus devices.

BRIEF DESCRIPTION OF THE INVENTION

Some or all of the above needs and/or problems may be addressed by certain embodiments of the invention. Embodiments of the invention may include systems and methods for recording data associated with the operation of Foundation Fieldbus devices. According to one embodiment of the invention, there is disclosed a method for recording data associated with Foundation Fieldbus devices. Device parameter data associated with one or more Foundation Fieldbus devices may be received by a device comprising one or more computers. A visual representation of the operation of the one or more Foundation Fieldbus devices may be generated by the device receiving the device parameter data. The device may then record at least a portion of the device parameter data received to generate the visual representation.

According to another embodiment of the invention, there is disclosed a system for recording data associated with Foundation Fieldbus devices. The system may include at least one memory and at least one processor. The at least one memory may be configured to store computer-executable instructions. The at least one processor may be configured to access the at least one memory and execute the computer-executable instructions to: receive device parameter data associated with one or more Foundation Fieldbus devices; generate, utilizing the received device parameter data, a visual representation of the operation of the one or more Foundation Fieldbus devices; and record at least a portion of the received device parameter data utilized to generate the visual representation.

Additional systems, methods, apparatus, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Figure 1:
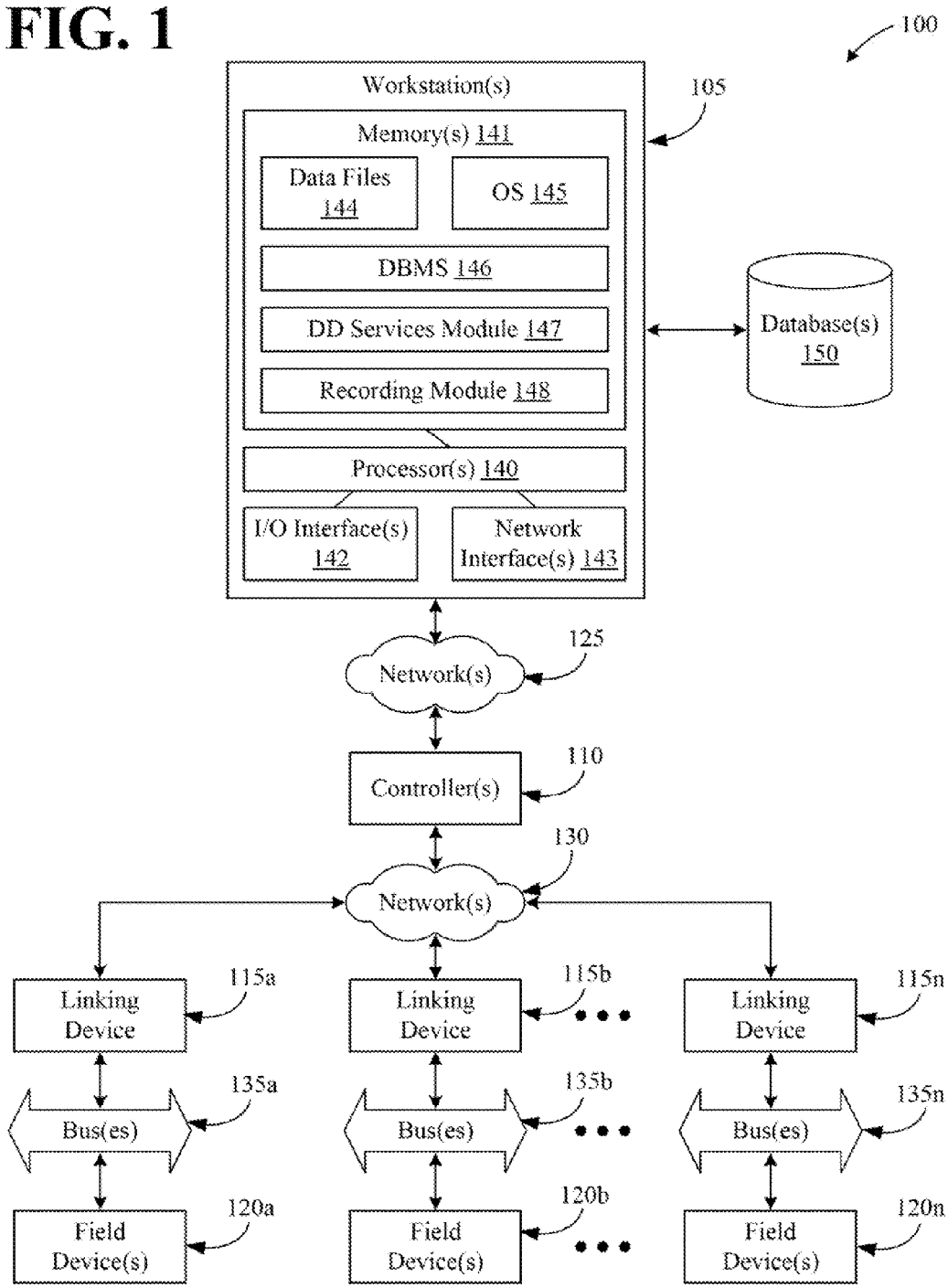

Having thus described the invention in general terms, reference will now be made to the accompanying drawings, which are not necessarily drawn to scale, and wherein:

FIG. 1 is a block diagram of one example control system that may be utilized in accordance with various embodiments of the invention.

Figure 2:
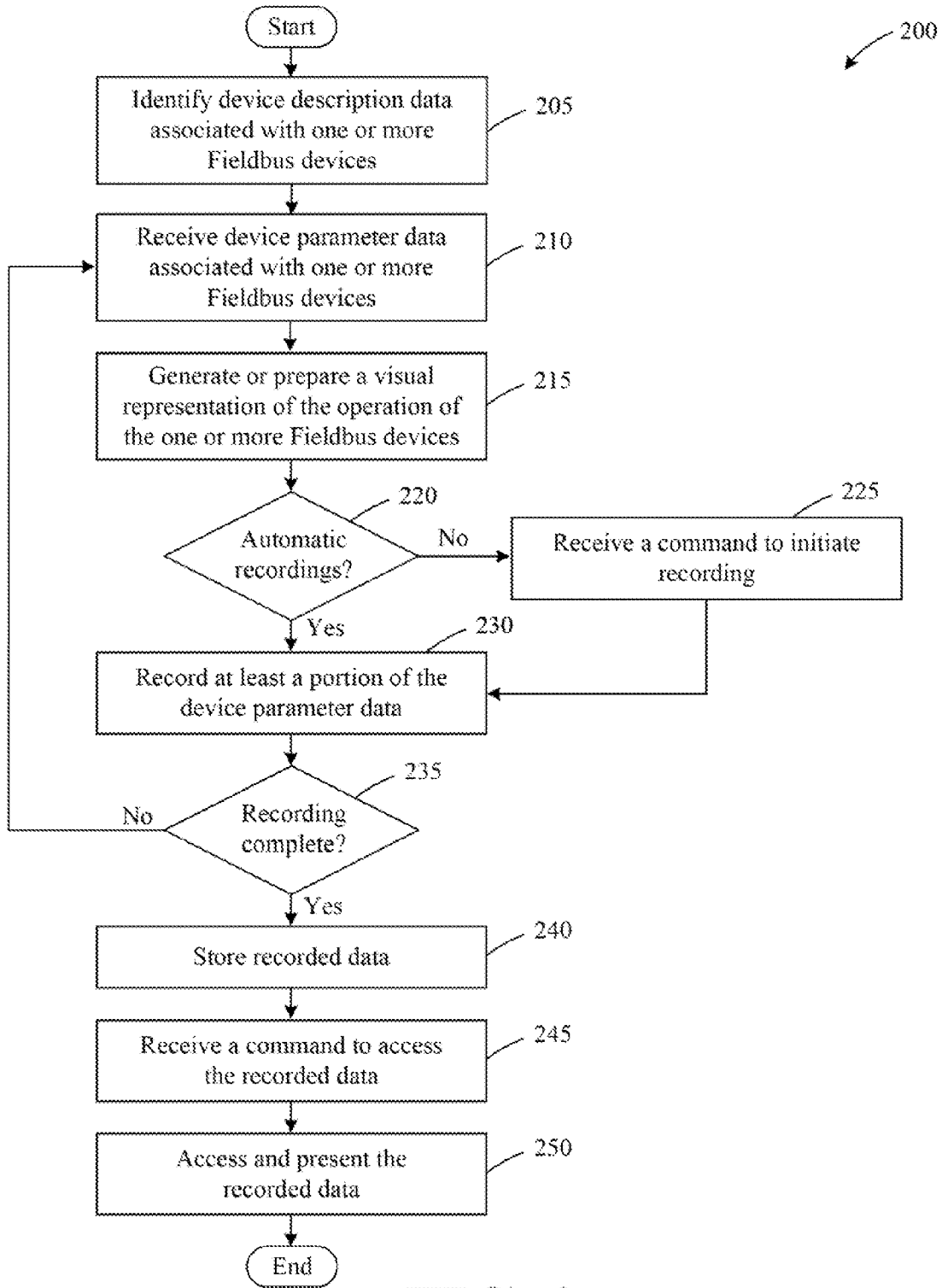

FIG. 2 is a flow diagram of one example method for recording device parameter data associated with Foundation Fieldbus devices, according to an illustrative embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems and methods for recording data associated with the operation of Foundation Fieldbus devices. In one example embodiment, a system that includes one or more computers, such as a control system or a workstation associated with a control system, may be configured to receive live device parameter data associated with the operation of one or more Foundation Fieldbus devices. In certain embodiments, the device parameter data may include data that is output by at least one Foundation Fieldbus device, such as a Fieldbus linking device or another Fieldbus device. Additionally, as desired, the received device parameter data may include live data that is collected in real time or near real time.

Once device parameter data has been received or collected, a visual representation of the operation of the one or more Fieldbus devices may be generated. For example, a visual representation of measurements, readings, and/or other data associated with the Fieldbus devices may be generated. As desired, the visual representation may be formed as a user interface, and the visual representation may include suitable user controls. In certain embodiments, suitable Fieldbus Device Description ("DD") Services and/or Device Definition Services may be utilized in the veneration of a visual representation. For example, suitable DD Visualization controls, such as charts, variable control representations, grids, and/or graph controls, may be utilized to generate and/or prepare a visual representation. According to an aspect of the invention, the visual representation may illustrate or depict received device parameter data and/or other live data associated with the operation of the Fieldbus devices. Additionally, the illustrated values may be updated and/or dynamically changed as additional data is received.

Additionally, as desired, device description data associated with the Foundation Fieldbus devices may be utilized in the generation of a visual representation. The device description data may include a wide variety of identification and/or configuration data associated with the Fieldbus devices. In certain embodiments, the device description data may be stored in one or more files, such as binary files provided by manufacturers of the Fieldbus devices, that are accessed by the device that generated the visual representation. For example, host software associated with a workstation may read stored binary files to determine device description data, and at least a portion of the device description data may be utilized during the generation of a visual representation.

According to an aspect of the invention, at least a portion of the device parameter data that is utilized to generate the visual representation may be recorded. For example, in certain embodiments, at least a portion of the device parameter data may be stored in one or more suitable Extensible Markup Language ("XML") files and/or databases. In certain embodiments, a recording may be initiated based at least in part upon the receipt of a command to initiate the recording, such as a command received via user control options provided by the visual representations and/or commands received from an external device in communication with the device that prepares the visual representation. In other embodiments, at least a portion of the device parameter data may be continuously recorded. For example, a memory buffer may be utilized to continuously record a most recent portion of collected device parameter data.

As a result of recording device parameter data, a technician or other user may be able to request and access stored device parameter data and, as desired, play back the stored data. In this regard, a wide variety of analyses may be performed by the user. For example, historical behavior of Fieldbus devices may be analyzed and/or trends may be determined. Such analyses may be useful for a wide variety of different purposes, such as diagnosing and/or pinpointing problems within a control system.

Various embodiments of the invention may include one or more special purpose computers, systems, and/or particular machines that facilitate the recording of device parameter data associated with the operation of Foundation Fieldbus devices. A special purpose computer or particular machine may include a wide variety of different software modules as desired in various embodiments. As explained in greater detail below, in certain embodiments, these various software components may be utilized to receive device parameter data associated with Foundation Fieldbus devices, generate a visual representation of the device parameter data, record at least a portion of the device parameter data, and/or facilitate the subsequent access of stored or recorded device parameter data.

Certain embodiments of the invention described herein may have the technical effect of facilitating the recording of device parameter data associated with Foundation Fieldbus devices. In this regard, dynamically changing device parameters or live data output by Foundation Fieldbus devices may be stored, thereby facilitating subsequent playback and/or other access of the data. As a result, a wide variety of analyses may be performed utilizing the historical device parameter data.

Various embodiments of the invention incorporate Foundation Fieldbus-type (hereinafter "Fieldbus") devices into control systems, for example, control systems associated with power generating devices (e.g., gas turbines, steam turbines, wind turbines, etc.), power plants, and/or process plants. A wide variety of Fieldbus devices may be utilized as desired in various embodiments of the invention. Examples of Fieldbus devices include, but are not limited to, sensors, gauges, measurement devices, valves, actuators, input/output subsystems, host systems, linking devices, any suitable Fieldbus HI devices, and/or any suitable Fieldbus high-speed Ethernet ("HSE") devices. In certain embodiments, HI devices may operate and/or communicate at a different rate than HSE devices. As one example, HI devices may operate at approximately 31.25 kilobits per second, and HSE devices may operate at approximately 100 megabits per second. As desired, various HSE devices, such as linking devices, may be utilized to interconnect HI devices to a central controller of the control system. Additionally, the term HSE protocol may be utilized to refer to a Fieldbus protocol that facilitates communications with HSE Fieldbus devices.

Communications between Fieldbus devices and/or between one or more controllers and/or processors of the control system and the Fieldbus devices may be facilitated by utilizing a Fieldbus protocol. The Fieldbus protocol is an all-digital serial, two-way communication protocol that provides a standardized physical interface to a bus or network interconnecting field equipment or Fieldbus devices. The Fieldbus protocol is an open-architecture protocol developed and administered by the Fieldbus Foundation. The Fieldbus protocol provides, in effect, a local area network for field instruments or field devices within a plant or facility, which enables these field devices to perform control functions at locations distributed throughout the facility and to communicate with one another before and after the performance of these control functions to implement an overall control strategy. Because the Fieldbus protocol enables control functions to be distributed throughout a process control network, it may reduce the workload of a central controller.

FIG. 1 is a block diagram of one example control system 100 that may be utilized in accordance with various embodiments of the invention. The control system 100 may include, for example, one or more workstations 105, one or more controllers 110 or control devices, one or more linking devices 115*a-n*, and/or one or more Fieldbus devices 120*a-n*. In certain embodiments, the workstations 105 may communicate with the controllers 110 via one or more suitable networks 125 or communication connections, and the controllers 110 may communicate with the linking devices 115*a-n* via one or more other networks 130 or communications buses. In other words, the controllers 110 may facilitate communications between the workstations 105 and the linking devices 115*a-n*. However, as desired in other embodiments, the workstations 105 may communicate directly with the linking devices 115*a-n*. In either case, the linking devices 115*a-n* may communicate with the various Fieldbus devices 120*a-n* via one or more suitable buses 135*a-n* or networks.

As desired, any number of linking devices 115*a-n* may be utilized in association with the control system 100. The linking devices 115*a-n* may be devices that are capable of communicating via a Fieldbus network or bus and via one or more relatively higher speed networks that facilitate communications with the controllers 110. For example, a linking device (generally referred to as linking device 115) may be a High Speed. Ethernet ("HSE") Fieldbus device or a combination HSE/HI device. As such, the linking device 115 may be capable of communicating with the controller 110 via a suitable Ethernet network or other suitable network 130. Additionally, the linking device 115 may be capable of communicating with connected Fieldbus devices 120*a-n* via one or more Fieldbus networks and/or data buses 135. As desired, the linking devices 115*a-n* may facilitate communication between the controller 110 and the Fieldbus devices 120*a-n*. Alternatively, in other embodiments, a Fieldbus device 120 may be in direct communication with a controller 110 via a suitable network 130 or bus 135.

A linking device 115 may include any number of segments and/or connections to which a Fieldbus data bus 135 or local Fieldbus network may be connected. For example, in certain embodiments, a linking device 115 may include four (4) segments, although any other number of segments may be included as desired. Each segment may establish a separate communications channel and be configured to facilitate communications between the linking device 115 and the Fieldbus devices connected to the segment.

In operation, a linking device 115 may be configured to transmit or communicate a wide variety of messages, such as timing messages and/or messages including parameter data or other live data output by the Fieldbus devices 120a-n, to the controller 110. For example, in certain embodiments, one or more messages may be periodically communicated. As another example, one or more messages may be communicated based upon detected changes in monitored values. According to an aspect of the invention, a communicated message may include timing information and/or device parameter data associated with the Fieldbus devices 120a-n connected to the linking device 115. As an alternative to receiving a message from a linking device 115, a message may be received directly from a Fieldbus device 120 in certain embodiments of the invention.

With continued reference to FIG. 1, any number of Fieldbus devices 120a-n may be utilized in association with the control system 100. In certain embodiments, each Fieldbus device (generally referred to as device 120) may be in communication with a linking device 115 via a local Fieldbus network or data bus 135. In this regard, communications between the Fieldbus device 120 and the controller 110 may be facilitated by the linking device 115. In other embodiments, a Fieldbus device 120 may be in direct communication with a controller 110. A wide variety of different types of Fieldbus devices may be utilized as desired in various embodiments of the invention, including any number of HI Fieldbus devices and/or other suitable devices. In certain embodiments, the Fieldbus devices 120a-n may be distributed or situated at varying points within a power plant or process plant. In this regard, the Fieldbus devices 120a-n may be utilized to monitor and/or control various aspects and/or operations of a plant.

In certain embodiments, a Fieldbus device 120 may be operable or configured to communicate device parameter data, such as measurements data, events data, and/or any other suitable data associated with the operation of the Fieldbus device 120, to the controller 110. For example, the Fieldbus device 120 may be configured to output data in accordance with a relevant operating cycle.

With continued reference to FIG. 1, the one or more illustrated networks 130 may include any suitable network or combination of networks that facilitate communications between the linking devices 115a-n and the controllers 110. Similarly, the illustrated networks 125 may include any suitable network or combination of networks that facilitate communications between the controllers 110 and the workstations 105. The Fieldbus data buses 135a-n or networks may include any number of suitable data buses and/or local area networks that facilitate communication between the linking devices 115a-n and the Fieldbus devices that are connected to the linking devices 115a-n. Examples of suitable networks and/or data buses include, but are not limited to, a local area network, a wide area network, the Internet, a radio frequency. ("RF") network, a Bluetooth™ enabled network, any suitable wired network, any suitable wireless network, or any suitable combination of wired and wireless networks. In certain embodiments of the invention, such as embodiments that utilize an Ethernet network, one or more Ethernet switches may be provided. The Ethernet switches may route data within the network. Each of the Ethernet switches may include hardware and/or software components that are operable to facilitate the routing of data within the network. Examples of suitable Ethernet switches include, but are not limited to, network bridges, multilayer switches, etc. As desired in various embodiments of the invention, redundant components may be provided within a network and/or the control system 100. For example, redundant wiring, switches, and/or routers may be provided. Additionally, in certain embodiments, redundant linking devices 115a-n and/or segments may be provided. In this regard, adequate operations may be maintained within the control system 100 in the event of failure of certain network devices.

With continued reference to FIG. 1, the control system 100 may include one or more controllers 110, such as a central controller. Some examples of suitable controllers are a Mark™ VI control system and a Mark™ Vie control system provided by the General Electric Company. A controller 110 may be configured to communicate with and/or control other components of the control system 100 and/or the components of the plant or system that is controlled by the control system 100. Additionally, the controller 110 may be configured to receive data associated with the operation of the Fieldbus devices 120a-n and/or the linking devices 115a-n, to process at least a portion of the received data, and/or to output one or more control signals or other messages for receipt by any number of linking devices 115a-n and/or Fieldbus devices 120a-n. According to an aspect of the invention, the controller 110 may communicate certain data, such as device parameter data associated with the Fieldbus devices 120, to the one or more workstations 105. In this regard, a user interface associated with the control system 100 may be provided, and a user (e.g., a technician, etc.) may be presented with data associated with control system operations. In certain embodiments, data (e.g., live data, etc.) may be provided to a workstation 105 in real time or near real time in order to dynamically provide up-to-date control system information. Additionally, the controller 110 may be configured to receive, from the workstations 105, user instructions associated with operation of the control system 100 and/or the Fieldbus devices 120a-n.

According to an aspect of the invention, one or more workstations 105 may be provided. As desired, these workstations 105 may provide a human machine interface ("HMI") between the control system 100 and one or more operators of the control system 100. For example, the workstations 105 may facilitate the receipt of user input and/or user commands associated with the operation of the control system 100. Additionally, the workstations 105 may be configured to receive data from the controller 110, such as presentations and/or other information associated with the connected Fieldbus devices 120a-n. The workstations 105 may further be configured to display at least a portion of the received data to a user via a suitable display device, such as a monitor. In this regard, various device parameter data associated with the operation of the Fieldbus devices 120a-n may be communicated to the workstations 105 for display to a user. In certain embodiments, the workstations 105 may additionally facilitate the receipt and processing of user inputs and commands. For example, a workstation 105 may receive a command to be communicated to a Fieldbus device 120. As another example, a workstation 105 may receive and process a command to display device parameter data. As yet another example, a workstation 105 may receive and process commands to record and/or access device parameter data.

Each workstation 105 may include one or more suitable computers or computing devices, such as personal computers, handheld computing devices, mini-computers, etc. In certain embodiments, the operations of the workstation 105 may be controlled by computer-executed or computer-implemented instructions that are executed by one or more processors associated with the workstation 105. The instructions may be embodied in one or more software components as desired in various embodiments of the invention. The execution of the instructions may form a special purpose computer or other particular machine that is operable to control the operations of the workstation 105 and/or to facilitate the recording of device parameter data associated with the Fieldbus devices 120a-n. The one or more processors that control the operations of the workstation 105 may be incorporated into the workstation 105 and/or in communication with the workstation 105 via one or more suitable networks. In certain embodiments of the invention, the operations and/or control of the workstation 105 may be distributed among several processing components.

Additionally, each workstation 105 may be in communication with the controller(s) 110 via one or more suitable network connections 125, for example, a direct link or direct connection, a local area network, a wide area network, the Internet, a radio frequency ("RF") network, a Bluetooth™ enabled network, any suitable wired network, or any suitable wireless network. In this regard, user commands, instructions, and/or other input associated with the operation of the control system 100 may be received by the workstations 105 and communicated to the controller 110. Additionally, output data associated with the operations of the control system 100 and/or a plant or other system monitored by the control system 100 may be communicated to the workstations 105 by the controller 110 for output and/or display to a user.

The workstation 105 may include one or more processors 140, one or more memory devices 141, one or more input/output ("I/O") interface devices 142, and/or one or more network interface device(s) 143. The one or more memory devices 141 may be any suitable memory devices, for example, caches, read-only memory devices, random access memory devices, magnetic storage devices, etc. The one or more memory devices 141 may store data, executable instructions, and/or various program modules utilized by the workstation 105, for example, one or more data files 144, an operating system ("OS") 145, a database management system ("DBMS") 146, a Device Description ("DD") Services module 147, and/or a recording module 148. The data files 144 may include any suitable data associated with the operation of the workstation and/or the control system 100, for example, measurements data, operating data, device parameter data, live data, device description data, data associated with the controllers 110, data associated with the linking devices 115a-n, and/or data associated with the Fieldbus devices 120a-n. The OS 145 may include executable instructions and/or program modules that facilitate and/or control the general operation of the workstation 105. For example, the OS 145 may facilitate the execution of other software programs and/or program modules by the processors 140. The DBMS 146 may facilitate the storage, access, and/or management of information stored in any number of suitable databases 150 associated with the workstation 105. The databases 150 may be stored in the memory 141 or in one or more external memories accessible by the workstation 105. Additionally, the databases 150 may store any suitable data as desired in various embodiments, such as recorded device parameters and/or live data received from the Fieldbus devices 120a-n.

The DD Services module 147 may be a suitable software module that facilitates the receipt and display of data associated with the linking devices 115a-n and the Fieldbus devices 120a-n. In certain embodiments, the DD Services module 147 may include functionality associated with a DD Services kit for Foundation Fieldbus devices, such as a DD Services kit provided by one or more manufacturers of Fieldbus devices. For example, the DD Services module 147 may include functionality for generating one or more visual representations in association with a Fieldbus specification. In certain embodiments, the DD Services module 147 may include visualization functionality, such as functionality that facilitates the generation, preparation, and/or display of various charts, graphs, waveforms, variable control representations, grids, and/or other interfaces associated with Foundation Fieldbus data.

In operation, the device parameter data (e.g., measurements, readings, operational data, etc.), also known as live data, may be output by one or more Fieldbus devices 120a-n and received by the DD Services module 147. In certain embodiments, the device parameter data may be communicated to the workstation 105 and the DD Services module 147 via the linking devices 115a-n and/or the controllers 110. In certain embodiments, the device parameter data may include data that is received by the DD Services module 147 in real time or near real time as the data is output by the Fieldbus devices 120a-n.

Once device parameter data has been received or collected, the DD Services module 147 may utilize at least a portion of the received data to generate or prepare one or more visual representations associated with the operation of one or more of the Fieldbus devices 120a-n. For example, a visual representation of measurements, readings, and/or other data associated with the Fieldbus devices 120a-n may be generated. In certain embodiments, the visual representation may illustrate or depict received device parameter data and/or other live data associated with the operation of the Fieldbus devices 120a-n. Additionally, the illustrated values may be updated and/or dynamically changed as additional data is received. As desired, a visual representation may be formed as a user interface, and the visual representation may include any number of suitable user controls and/or selectable indicators that facilitate the receipt of user instructions. For example, a visual representation may facilitate user instructions associated with desired data to be displayed, requests to record data, and/or requests to access and/or play back previously recorded data.

Additionally, as desired in certain embodiments, the DD Services module 147 may utilize device description data associated with the Foundation Fieldbus devices 120a-n in the generation of one or more visual representations. The device description data may include a wide variety of identification and/or configuration data associated with the Fieldbus devices 120a-n. In certain embodiments, the device description data may be stored in one or more files, such as electronic device description language ("EDDL") binary files provided by manufacturers of the Fieldbus devices, that are accessed by the DD Services module 147 and utilized to generate one or more visual representations. In other embodiments, the device description data may be received by the workstation 105 and/or the DD Services module 147 from any number of suitable external sources.

The recording module 148 may be a suitable software module that facilitates the recording of device parameter data that is processed by the workstation 105 and/or the DD Services module 147. In certain embodiments, the recording module 148 may facilitate an automatic recording of device parameter data. In other embodiments, the recording module 148 may facilitate recording in response to one or more user requests to record data, such as requests received via the user controls associated with a visual representation. In yet other embodiments, the recording module 148 may access and utilize various user profiles and/or preferences to facilitate the recording of device parameter data. For example, data may be recorded based upon the identification of one or more predetermined conditions, such as a triggered alert or a determination that the value of a parameter has exceeded a threshold value.

A wide variety of suitable methods and/or techniques may be utilized by the recording module 148 to facilitate the recording of device parameter data. For example, in certain embodiments, at least a portion of the device parameter data may be stored in one or more suitable Extensible Markup Language ("XML") files and/or databases 150. Additionally, in certain embodiments, a recording may be initiated based at least in part upon the receipt of a command to initiate the recording, such as a command received via user control options provided by a visual representation and/or commands received from an external device in communication with the device that prepares the visual representation. For example, suitable user commands may be utilized to "start" and to "stop" recordings. In other embodiments, at least a portion of the device parameter data may be continuously recorded. For example, a memory buffer may be utilized to continuously record a most recent portion of collected device parameter data.

Once device parameter data has been recorded, the recording module 148 may facilitate the subsequent access of at least a portion of the stored or recorded device parameter data. For example, the recording module 148 may receive user inputs (e.g., time periods, access credentials, etc.), and the recording module 148 may access recorded device parameter data based at least in part upon the received user inputs. In this regard, a technician or other user associated with the control system 100 may view and/or evaluate historical device parameter data. As a result of recording device parameter data, a technician or other user may be able to request and access stored device parameter data and, as desired, play back the stored data. In this regard, a wide variety of analyses may be performed by the user. For example, the historical behavior of Fieldbus devices may be analyzed and/or trends may be determined. Such analyses may be useful for a wide variety of different purposes, such as diagnosing and/or pinpointing problems within a control system. Additionally, as desired, at least a portion of the recorded data may be provided to one or more suitable models and/or analytical programs.

One example of the operations that may be performed by the DD Services module 147 and/or the recording module 148 is described in greater detail below with reference to FIG. 2.

With continued reference to the workstation 105, the one or more I/O interface devices 142 may facilitate interaction between the workstation 105 and any number of suitable input and/or output devices. In this regard, user inputs and/or other inputs may be received by the workstation 105. Additionally, a wide variety of data may be output by the workstation 105 for presentation to a user. Examples of suitable input and output devices include, but are not limited to, a keyboard, a keypad, a mouse, a display, a touch screen display, a microphone, a speaker, removable memory devices, and/or any number of devices that communicate via suitable data ports. The one or more network interface devices 143 may facilitate connection of the workstation 105 to any number of networks, such as the networks 125 illustrated in FIG. 1. In this regard, the workstation 105 may communicate with any number of other components of the control system 100, such as the controllers 110.

As desired, embodiments of the invention may include a control system 100 with more or less than the components illustrated in FIG. 1. The control system 100 of FIG. 1 is provided by way of example only. Additionally, embodiments of the invention may be utilized in association with any system that makes use of Foundation Fieldbus devices and are not limited to control systems.

FIG. 2 is a flow diagram of one example method 200 for recording device parameter data associated with Foundation Fieldbus devices, according to an illustrative embodiment of the invention. The method 200 may be performed by a suitable workstation or other suitable computing device, such as the workstation 105 associated with the control system 100 of FIG. 1. In certain embodiments, the method 200 may be performed by a suitable DD Services module and/or recording module, such as the DD Services module 147 and/or the recording module 148 illustrated in FIG. 1. The method 200 may begin at block 205.

At block 205, device description data associated with one or more Foundation Fieldbus devices, such as the Fieldbus devices 120a-n illustrated in FIG. 1, may be identified. The device description data may include, for example, identification data and/or configuration data associated with the Fieldbus devices 120a-n. In certain embodiments, the device description data may be accessed from one or more files of data that have been received from one or more device manufacturers and/or other entities. As desired, the device description data may be utilized to identify a wide variety of information associated with the Fieldbus devices 120a-n and/or to generate and/or prepare one or more visual or graphical representations of Fieldbus data.

At block 210, device parameter data associated with one or more Fieldbus devices 120a-n may be received. For example, live device parameter data associated with the operation of one or more Foundation Fieldbus devices 120a-n may be received. In certain embodiments, the device parameter data may include data that is output by at least one Foundation Fieldbus device, such as a Fieldbus linking device or another Fieldbus device. As desired, the device parameter data may be communicated to a workstation 105 via one or more suitable controllers 110. Additionally, as desired, the received device parameter data may include live data that is collected in real time or near real time.

At block 215, at least one visual representation of the operation of the one or more Fieldbus devices 120a-n may be generated or prepared utilizing the device parameter data. For example, a visual representation of measurements, readings, and/or other data associated with the Fieldbus devices 120a-n may be generated. In certain embodiments, the illustrated values may be updated and/or dynamically changed as additional data is received. As desired, the visual representation may be formed as a user interface, and the visual representation may include suitable user controls. In certain embodiments, suitable Fieldbus Device Description ("DD") Services and/or Device Definition Services may be utilized in the generation of a visual representation. For example, suitable DD Visualization controls, such as charts, variable control representations, grids, and/or graph controls, may be utilized to generate and/or prepare a visual representation. Additionally, as desired, device description data associated with the Foundation Fieldbus devices may be utilized in the generation of a visual representation.

At block 220, a determination may be made as to whether automatic recordings have been established, authorized, and/or scheduled. For example, one or more user profiles and/or automatic recording settings may be evaluated in order to determine whether an automatic recording should be completed. As another example, a determination may be made as to whether a buffer has been established for automatic recording purposes. If it is determined at block 220 that an automatic recording has been established and/or that an automatic recording should be performed, then operations may continue at block 230 described below, and a recording may be initiated. If, however, it is determined at block 220 that an automatic recording should not be performed, then operations may continue at block 225. At block 225, a command to initiate a recording may be received. For example, a user may utilize one or more interface options (e.g., selectable indicators and/or buttons, etc.) to request the initiation of a recording. Operations may then continue at block 230.

As desired, a recording request and/or automatic recording parameters may specify device parameters to be recorded. Alternatively, all available device parameters may be recorded. Additionally, although automatic and manual recordings are described separately, both automatic and manual recordings may be performed simultaneously as desired. For example, an automatic recording may record certain device parameters while a manual recording is utilized to record other device parameters.

At block 230, at least a portion of the received device parameter data may be recorded. A wide variety of suitable methods and/or techniques may be utilized to facilitate the recording of device parameter data. For example, in certain embodiments, at least a portion of the device parameter data may be stored in one or more suitable Extensible Markup Language ("XML") files and/or databases 150.

At block 235, which may be optional in certain embodiments of the invention, a determination may be made as to whether a recording has been completed. For example, a determination may be made as to whether a desired recording time has been reached. As another example, a determination may be made as to whether user input to stop a recording has been received. If it is determined at block 235 that a recording has not been completed, then operations may continue at block 210 and updated device parameter data may be received and recorded. If, however, it is determined at block 235 that a recording has been completed, then operations may continue at block 240. In certain embodiments, a continuous recording may be made. Therefore, the determination of whether a recording is complete may be optional.

At block 240, the recorded data may be stored in one or more suitable memory devices and/or databases. For example, recorded data may be stored in one or more suitable XML files. As another example, recorded data may be stored in a suitable buffer. Although the storage of recorded data is illustrated as occurring following the recording step, the illustrated operational sequence is provided in order to facilitate ease in understanding the invention. As desired, data may be stored as it is recorded.

At block 245, a command to access at least a portion of the recorded device parameter data may be received. For example, one or more suitable user controls included in the visual representation(s) may be selected by a user in order to request the access of recorded data. As another example, an access command may be received from an external device, such as an external system and/or an external user device. Once a command to access recorded data has been received, operations may continue at block 250. At block 250, at least a portion of the recorded data may be accessed based at least in part upon the received command. The accessed data may then be utilized in order to prepare one or more presentations that are output for display to a user. For example, accessed data may be included in a visual representation associated with a playback feature. In this regard, historical device parameter data may be accessed and viewed by a user.

The method 200 may end following block 250.

The operations described in the method 200 do not necessarily have to be performed in the order set forth in FIG. 2, but instead may be performed in any suitable order. Additionally, in certain embodiments of the invention, more or less than all of the elements or operations set forth in FIG. 2 may be performed.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for collecting data, the method comprising:
communicatively coupling a controller to a Foundation Fieldbus device via a network;
receiving in one of real time or near real time, by the controller, via the network, measurements data that is output from the Foundation Fieldbus device;
identifying, by the controller, device description data associated with the Foundation, Fieldbus device;
using the device description data to generate a visual representation of the measurements data received from the Foundation Fieldbus device;
determining a user profile associated with a user of the Foundation Fieldbus device;
evaluating at least one of a user profile or a recording setting to determine at least one of an authorization, an establishment, or a scheduling of an automatic recording of the measurements data; and
upon determining the authorization, establishment, or scheduling of an automatic recording, automatically initiating a recording, by the controller, of at least a portion of the measurements data that is received in one of real time or near real time;
receiving a request to access the recorded measurements data;
directing, in response to the received request, access of the recorded measurements data; and
directing the output of the accessed measurements data for presentation.

2. The method of claim 1, wherein the controller is a central controller configured to control a plurality of Foundation Fieldbus devices via the network.

3. The method of claim 1, wherein the visual representation comprises at least one of (i) a chart, (ii) a variable control representation, or (iii) a grid.

4. The method of claim 1, wherein recording at least a portion of the measurements data comprises recording at least a portion of the measurements data in an Extensible Markup Language (XML) database.

5. The method of claim 1, wherein recording at least a portion of the measurements data comprises continuously recording at least a portion of the measurements data.

6. A system comprising:
at least one memory operable to store computer-executable instructions;
at least one processor configured to access the at least one memory and execute the computer-executable instructions to:
communicatively couple a controller to a Foundation Fieldbus device via a network;
receive in one of real time or near real time, in the controller, via the network, measurements data that is output by the Foundation Fieldbus device;
identify, by the controller, device description data associated with the Foundation Fieldbus device;
use the device description data to generate a visual representation of the measurements data received from the Foundation Fieldbus device;
determine a user profile associated with a user of the Foundation Fieldbus device;
evaluate at least one of a user profile or a recording setting to determine at least one of an authorization, an establishment, or a scheduling of an automatic recording of the measurements data; and
based on the authorization, establishment, or scheduling of an automatic recording, automatically record at least a portion of the measurements data that is received in one of real time or near real time;
receive a request to access the recorded measurements data;
direct, in response to the received request, access of the recorded measurements data; and
direct the output of the accessed measurements data for presentation.

7. The system of claim 6, wherein the controller is a central controller configured to control a plurality of Foundation Fieldbus devices via the network.

8. The system of claim 6, wherein the generated visual representation comprises at least one of (i) a chart, (ii) a variable control representation, or (iii) a grid.

9. The system of claim 6, wherein the at least a portion of the measurements data is recorded in an Extensible Markup Language (XML) database.

10. The method of claim 1, further comprising:
determining completion of the automatic recording; and
storing the at least a portion of the received measurements data in at least one of a memory device or a database.

11. The method of claim 10, further comprising:
receiving a command to access at least a portion of the received measurements data stored in the at least one of a memory device or a database;
accessing the at least a portion of the received measurements data stored in the at least one of a memory device or a database; and
using the at least a portion of the received measurements data that is accessed from the at least one of a memory device or a database, to prepare one or more presentations for a user display.

12. The method of claim 11, further comprising:
providing a playback feature on the user display for viewing historical measurements data accessed from the at least one of a memory device or a database.

13. The method of claim 1, further comprising:
while automatically recording the at least a portion of the received measurements data, storing the at least a portion of the received measurements data in at least one of a memory device or a database.

* * * * *